US012369109B2

(12) United States Patent
Catovic et al.

(10) Patent No.: US 12,369,109 B2
(45) Date of Patent: Jul. 22, 2025

(54) WIRELESS NETWORK SELECTION IN INTERNATIONAL AREAS (71) Applicant: QUALCOMM Incorporated, San Diego, CA (US)

(72) Inventors: Amer Catovic, San Diego, CA (US); Osama Lotfallah, San Diego, CA (US); Lenaig Genevieve Chaponniere, La Jolla, CA (US); Stephen William Edge, Escondido, CA (US); Bharat Shrestha, San Diego, CA (US); Francesco Pica, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/515,209

(22) Filed: Oct. 29, 2021

(65) Prior Publication Data

US 2022/0141764 A1 May 5, 2022

Related U.S. Application Data (60) Provisional application No. 63/110,310, filed on Nov. 5, 2020.

(51) Int. Cl.
*H04W 48/18* (2009.01)
*H04W 8/26* (2009.01)
(Continued)

(52) U.S. Cl.
CPC ............. *H04W 48/18* (2013.01); *H04W 8/26* (2013.01); *H04W 60/04* (2013.01); *H04W 84/042* (2013.01); *H04W 84/06* (2013.01)

(58) Field of Classification Search
CPC ....... H04W 48/18; H04W 8/26; H04W 60/04; H04W 84/042; H04W 84/06
See application file for complete search history.

(56) References Cited

U.S. PATENT DOCUMENTS 10,374,960 B2 * 8/2019 Zhang .................... H04L 47/24
2007/0232354 A1 * 10/2007 Moscovitz ............ H04W 8/265
455/411

(Continued)

FOREIGN PATENT DOCUMENTS

WO  2017210447 A1  12/2017
WO  2023075994 A1   5/2023

OTHER PUBLICATIONS

SA WG2: "3rd Generation Partnership Project; Technical Specification Group Services and System Aspects; Study on Architecture Aspects for Using Satellite Access in 5G (Release 17)", 3GPP TSG SA Meeting #86, SP-191095, 3rd Generation Partnership Project (3GPP), Sitges, Spain, Dec. 10-13, 2019, 85 Pages, Retrieved from the Internet: URL: https://ftp.3gpp.org/tsg_sa/TSG_SA/TSGS_86/Docs/SP-191095.zip 23737-200.zip 23737-200.docx [Retrieved on Dec. 6, 2019].

(Continued)

*Primary Examiner* — Charles N Appiah
*Assistant Examiner* — Nicole M Louis-Fils
(74) *Attorney, Agent, or Firm* — Seyfarth Shaw LLP (57) ABSTRACT A method of wireless communication performs a public land mobile network (PLMN) search for a higher priority PLMN. The PLMN search includes a candidate PLMN having a different mobile country code (MCC) than a serving PLMN. The method switches to the higher priority PLMN when the PLMN search locates the higher priority PLMN. A method determines whether a user equipment (UE) has transitioned between an international area and a national area. The method triggers PLMN selection in response to the UE having transitioned between the international area and the national area.

12 Claims, 9 Drawing Sheets

(51) Int. Cl.
   *H04W 60/04*  (2009.01)
   *H04W 84/04*  (2009.01)
   *H04W 84/06*  (2009.01)

(56) References Cited

U.S. PATENT DOCUMENTS

| | | | | |
|---|---|---|---|---|
| 2010/0093344 | A1* | 4/2010 | Chan | H04W 8/02 |
| | | | | 455/433 |
| 2012/0164979 | A1* | 6/2012 | Bachmann | H04W 12/062 |
| | | | | 455/411 |
| 2017/0142645 | A1* | 5/2017 | Wu | H04W 48/16 |
| 2020/0213267 | A1* | 7/2020 | Salkintzis | H04W 48/16 |
| 2020/0221372 | A1* | 7/2020 | Shih | H04W 76/25 |
| 2020/0245235 | A1 | 7/2020 | Chun | |
| 2021/0337457 | A1 | 10/2021 | Jun et al. | |
| 2022/0124521 | A1* | 4/2022 | Xu | H04W 28/09 |
| 2022/0150812 | A1* | 5/2022 | Lin | H04W 60/04 |
| 2022/0201592 | A1* | 6/2022 | Lindheimer | H04W 48/10 |
| 2022/0232463 | A1* | 7/2022 | Sadique | H04W 8/08 |
| 2022/0232464 | A1* | 7/2022 | Matolia | H04W 60/04 |
| 2023/0134466 | A1* | 5/2023 | Lu | H04W 48/04 |
| | | | | 455/456.1 |
| 2023/0134628 | A1 | 5/2023 | Catovic | |
| 2023/0268984 | A1 | 8/2023 | Xu | |
| 2023/0379811 | A1* | 11/2023 | Niemi | H04W 48/18 |
| 2024/0306087 | A1 | 9/2024 | Catovic | |

OTHER PUBLICATIONS

Partial International Search Report—PCT/US2021/057617—ISA/EPO—Feb. 11, 2022.

Qualcomm Incorproated: "Deployment Scenarios", 3GPP TSG-CT WG1 Meeting #126-e, C1-205910, 3rd Generation Partnership Project (3GPP), Electronic Meeting, Oct. 15-23, 2020, 4 Pages, Retrieved from the Internet: URL: https://ftp.3gpp.org/tsg_ct/WG1_mm-cc-sm_ex-CN1/TSGC1_126e/Docs/C1-205910.zip C1-205910-24.821-Deployment_scenarios.doc [Retrieved on Oct. 7, 2020].

Qualcomm Incorporated: "Solution to Key Issue 3", 3GPP TSG-CT WG1 Meeting #127-e, C1-207746, 3rd Generation Partnership Project (3GPP), Electronic Meeting, Nov. 13-20, 2020, 3 Pages, Retrieved from the Internet: URL: https://ftp.3gpp.org/tsg_ct/WG1_mm-cc-sm_ex-CN1/TSGC1_127e/Docs/C1-207746.zip C1-207746_C1-207168-24.821-Solution_to_KI3.doc [Retrieved on Nov. 19, 2020].

Qualcomm Incorporated: "Virtual Cell Solution for Mobility and Regulatory Support for Satellite Access in 5G", SA WG2 Meeting #136, S2-1911058, 3rd Generation Partnership Project (3GPP), Reno, Nevada, USA, Nov. 18-22, 2019, 9 Pages, Retrieved from the Internet: URL: https://ftp.3gpp.org/tsg_sa/WG2_Arch/TSGS2_136_RenoDocs/S2-1911858.zip S2-1911058-TR 23.737-Virtual Cell solution.doc [retrieved on Nov. 8, 2019].

International Search Report and Written Opinion—PCT/US2021/057617—ISA/EPO—Apr. 4, 2022.

* cited by examiner

WIRELESS NETWORK SELECTION IN INTERNATIONAL AREAS

CROSS-REFERENCE TO RELATED APPLICATION

The present application claims the benefit of U.S. Provisional Patent Application No. 63/110,310, filed on Nov. 5, 2020, and titled "WIRELESS NETWORK SELECTION IN INTERNATIONAL AREAS," the disclosure of which is expressly incorporated by reference in its entirety.

FIELD OF THE DISCLOSURE

Aspects of the present disclosure generally relate to wireless communications, and more particularly to techniques and apparatuses for network selection for satellite access in international areas.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In aspects of the present disclosure, a method of wireless communication by a user equipment (UE) includes determining whether the UE transitioned between an international area and a national area. The method also includes triggering public land mobile network (PLMN) selection in response to the UE having transitioned between the international area and the national area.

In other aspects of the present disclosure, a method of wireless communication by a user equipment (UE) includes performing a public land mobile network (PLMN) search for a higher priority PLMN. The method also includes determining a list of candidates PLMNs based on the search. The method further includes selecting a PLMN from among the list of candidate PLMNs, each of the candidate PLMNs having either a mobile country code (MCC) the same as an identity of a serving PLMN or a shared MCC. The selected PLMN has a higher priority than the serving PLMN.

Other aspects of the present disclosure are directed to an apparatus for wireless communications performed by a wireless device having a processor, memory coupled with the processor and instructions stored in the memory. When the instructions are executed by the processor, the apparatus determines whether the UE transitioned between an international area and a national area. The apparatus also triggers public land mobile network (PLMN) selection in response to the UE having transitioned between the international area and the national area.

Other aspects of the present disclosure are directed to an apparatus for wireless communications performed by a wireless device having a processor, memory coupled with the processor and instructions stored in the memory. When the instructions are executed by the processor, the apparatus performs a public land mobile network (PLMN) search for a higher priority PLMN. The apparatus also determines a list of candidates PLMNs based on the search. The apparatus further selects a PLMN from among the list of candidate PLMNs, each of the candidate PLMNs having either a mobile country code (MCC) the same as an identity of a serving PLMN or a shared MCC. The selected PLMN has a higher priority than the serving PLMN.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Aspects of the present disclosure provide techniques for performing public land mobile network (PLMN) selection for non-terrestrial network (NTN) access, for example, via a satellite. As will be described, a satellite coverage area may span multiple countries and international areas. International areas include areas outside any jurisdiction of a country, and may also be referred to as extraterritorial areas.

In general, a legacy PLMN selection procedure is a procedure a user equipment (UE) uses to select a network to camp on and receive service. Aspects of the present disclosure address scenarios the legacy procedure does not cover, such as when the UE is physically located in an international area, or when the UE is served by a PLMN with a shared PLMN identity (ID), or when a radio cell is deployed to cover a geographical area located in an international area. The techniques described may be deployed, for example, by a UE to perform PLMN selection for NTN (e.g., satellite) access. In some cases, NTN access may be considered as a separate radio access technology (RAT) from terrestrial access.

According to aspects of the present disclosure for UEs located in international areas, if the UE is returning to coverage, the UE may apply a first option including triggering PLMN selection upon leaving or entering the international area. In a second option, the UE may also consider the home public land mobile network (HPLMN) list or equivalent home public land mobile network (EHPLMN) list as highest priority, instead of a recently registered PLMN. This may occur in addition to the first option, or instead of the first option. In addition, or alternatively, the UE may implement a third option, using a separate international PLMN selector list or relying on indications of whether a PLMN is intended for international access, that is, when coverage from a PLMN extends into in international area. In addition, or alternatively, in a fourth option, the UE may delete the equivalent PLMN list. If a periodic search for a high priority PLMN (HP-PLMN) occurs while the UE is roaming, the UE may apply a fifth option where the UE does not limit the search based on the mobile country code (MCC).

When the UE is served by a PLMN with a shared PLMN ID (e.g., with a mobile country code (MCC) starting with a nine, such as 9xx), the UE may be inside an international area, or outside an international area. In either case, it would be beneficial to have an improved PLMN selection procedure. According to aspects of the present disclosure, if the UE is served by a PLMN with a shared PLMN ID, during a PLMN search for a high priority public land mobile network (HP-PLMN), the UE does not eliminate the candidate PLMNs that have a different MCC from the serving PLMN. This applies to both PLMN selection inside international areas and within a country. In addition, or alternatively, the UE may implement the third option, using a separate international PLMN selector list or relying on indications of whether a PLMN is intended for international access.

Figure 1:
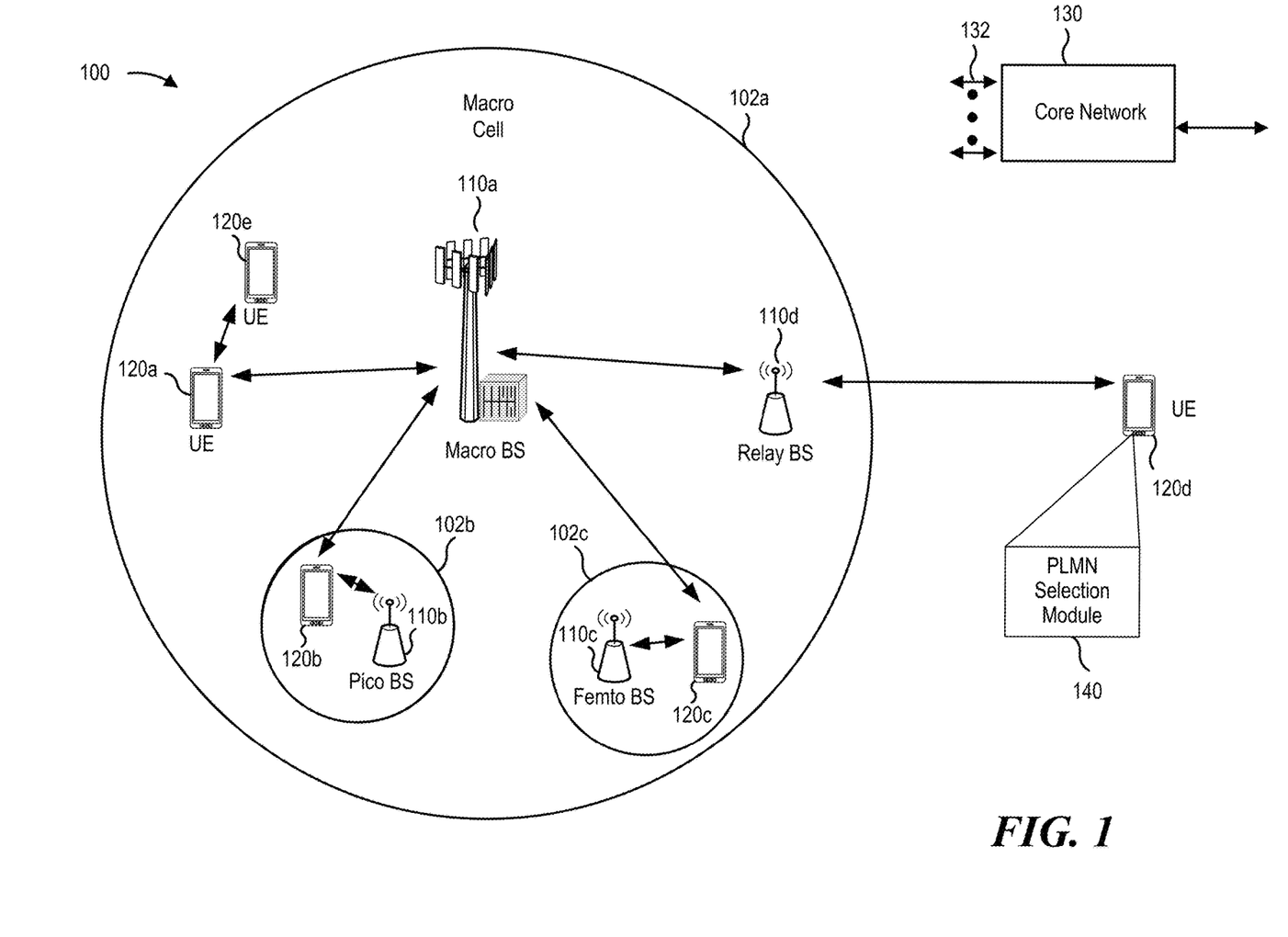
FIG. 1 is a block diagram conceptually illustrating an example of a wireless communications network, in accordance with various aspects of the present disclosure.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a PLMN selection module 140. For brevity, only one UE 120d is shown as including the PLMN selection module 140. The PLMN selection module 140 may perform a PLMN search for a higher priority PLMN. The PLMN selection module 140 may determine a list of candidate PLMNs based on the search. The PLMN selection module 140 may also select a PLMN from among the list of candidate PLMNs, each of the candidate PLMNs having either a mobile country code (MCC) the same as an identity of a serving PLMN or a shared MCC. The selected PLMN has a higher priority than the serving PLMN. The PLMN selection module 140 may determine whether a UE has transitioned between an international area and a national area. The PLMN selection module 140 may further trigger PLMN selection in response to the UE having transitioned between the international area and the national area.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
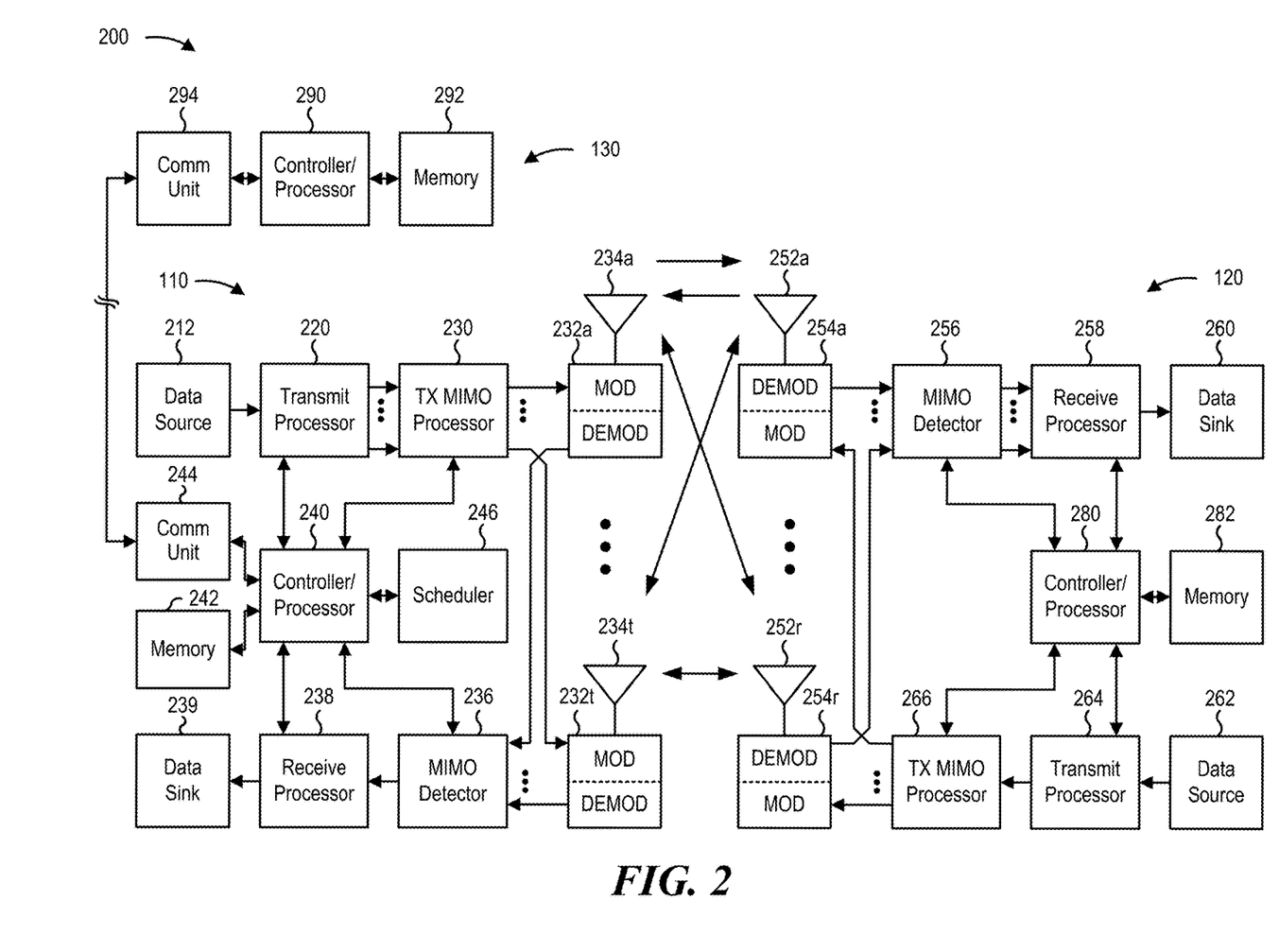
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MC S(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with PLMN selection, as described in more detail elsewhere. For example, the controller/processor 240 of the base station 110, the controller/processor 280 of the UE 120, and/or any other component(s) of FIG. 2 may perform or direct operations of, for example, the processes of FIGS. 6-10 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for determining, means for switching, means for selecting, means for triggering, means for prioritizing, means for deleting, means for retrieving, and/or means for receiving. Such means may include one or more components of the UE 120 described in connection with FIG. 2.

As indicated above, FIG. 2 is provided merely as an example. Other examples may differ from what is described with regard to FIG. 2.

Aspects of the present disclosure provide techniques for performing PLMN selection for non-terrestrial network (NTN) access, for example, via a satellite. As will be described, a satellite coverage area may span multiple countries and international areas. International areas include areas outside any jurisdiction of a country, and may also be referred to as extraterritorial areas.

In general, a legacy PLMN selection procedure is a procedure the UE uses to select a network to camp on and receive service (e.g., as specified in 3GPP TS 23.122). Aspects of the present disclosure address scenarios the legacy procedure does not cover, such as when the UE is physically located in an international area, or when the UE is served by a PLMN with a shared PLMN identity (ID). A shared PLMN ID has a three-digit mobile country code (MCC) starting with a nine, for example 9xx, where the x's can be any numbers. A shared PLMN ID may also be referred to as a global PLMN ID.

According to aspects of the present disclosure, a new branch of a PLMN selection procedure is introduced. The UE first decides whether it is located inside an international area. If so, the UE follows a new PLMN selection procedure. If not, the UE follows the legacy PLMN selection procedure.

The legacy PLMN selection procedure can trigger in one of two ways. The first is returning from loss of coverage, such as when a UE powers up, or loses and regains service. In this scenario, PLMNs are to be selected in a particular order. The UE will initially look to select the last registered PLMN, if available. If that PLMN is not available, then the UE proceeds down an ordered list of PLMNs to select in the following order:
  i) Either the home PLMN (HPLMN) (if the equivalent HPLMN (EHPLMN) list is not present or is empty) or the highest priority EHPLMN that is available (if the EHPLMN list is present);
  ii) Each PLMN and/or radio access technology (RAT) combination in the "User Controlled PLMN Selector with Access Technology" data file in the subscriber identity module (SIM) (e.g., in priority order);
  iii) Each PLMN and/or radio access technology combination in the "Operator Controlled PLMN Selector with Access Technology" data file in the SIM (e.g., in priority order) or stored in the UE (e.g., in priority order);
  iv) Other PLMN and/or radio access technology combinations with received high signal quality (e.g., in random order); or
  v) Other PLMN and/or radio access technology combinations in order of decreasing signal quality.

Another legacy PLMN selection procedure triggers periodically when the UE is currently being served by a PLMN, such as when the UE is roaming. That is, a roaming UE periodically searches for a higher priority PLMN and re-selects to a higher priority PLMN in the same country as the serving (current) PLMN (e.g., according to the same prioritization as the PLMN selection upon returning from coverage loss). In some cases, the UE may also consider PLMNs in a list of equivalent PLMNs provided by the serving PLMN (e.g., using non-access stratum (NAS) protocol signaling during the registration procedure).

In some cases, it may be beneficial to modify the legacy PLMN selection procedure to accommodate UEs in international areas or UEs served by a PLMN with a shared PLMN ID, such as with non-terrestrial network (NTN) access networks. Various deployments of NTNs, including satellite networks, are described with respect to FIGS. 3, 4, and 5.

Figure 3:
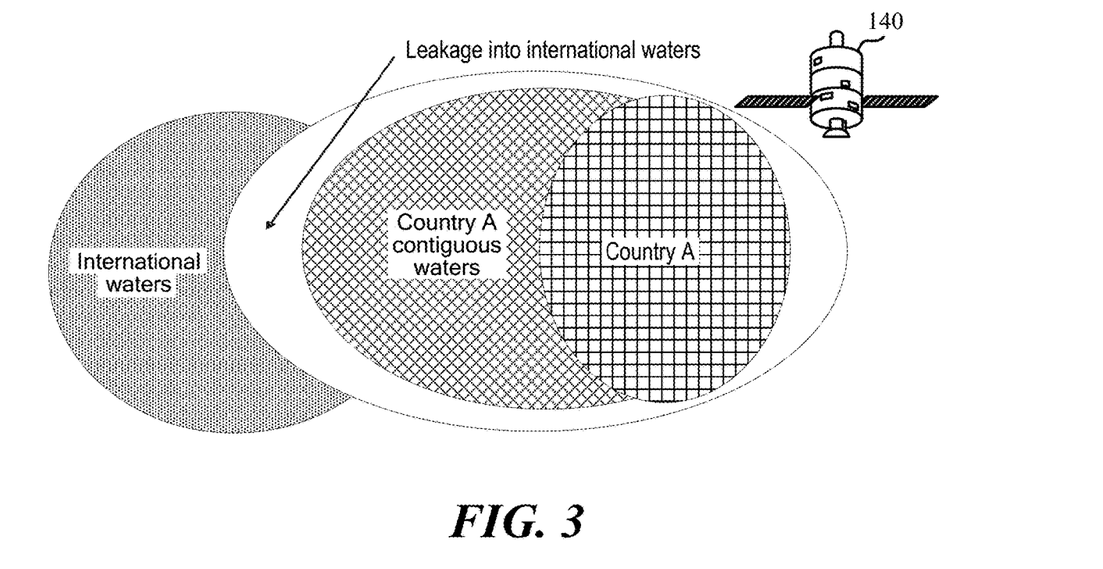
FIG. 3 is a diagram illustrating a deployment scenario of a non-terrestrial network (NTN), in accordance with aspects of the present disclosure.
Figure 4:
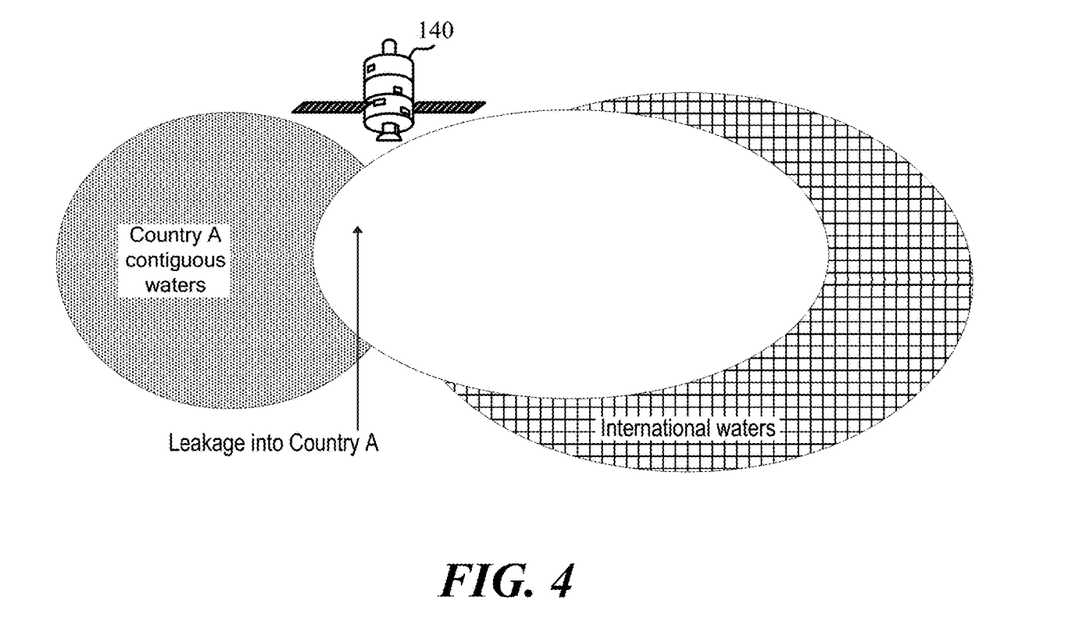
FIG. 4 is a diagram illustrating a deployment scenario of a non-terrestrial network (NTN), in accordance with aspects of the present disclosure.

FIGS. 3 and 4 are diagrams illustrating deployment scenarios of non-terrestrial networks (NTNs), in accordance with aspects of the present disclosure. FIG. 3 shows a deployment where NTN cell coverage targets one country (e.g., Country A) and that country's contiguous waters. In general, contiguous waters extend up to 200 miles from the shore of a given country. This is referred to as leakage into international waters. For broadcasting a PLMN ID in this deployment, different scenarios exist. In a first scenario, the broadcast PLMN ID has the mobile country code (MCC) of Country A. In another scenario, the PLMN ID includes the MCC of Country A and a shared MCC reserved for the international waters.

FIG. 4 shows a deployment where NTN cell coverage targets international waters only. In this deployment, there is leakage into adjacent contiguous waters of Country A. The PLMN ID may be broadcast in accordance with different scenarios. In a first scenario, the MCC of the home country of the operator is included in the PLMN ID. In a second scenario, the shared MCC is included. In a third scenario, the MCC of the home country of the operator and the shared MCC reserved for international waters is included.

Figure 5:
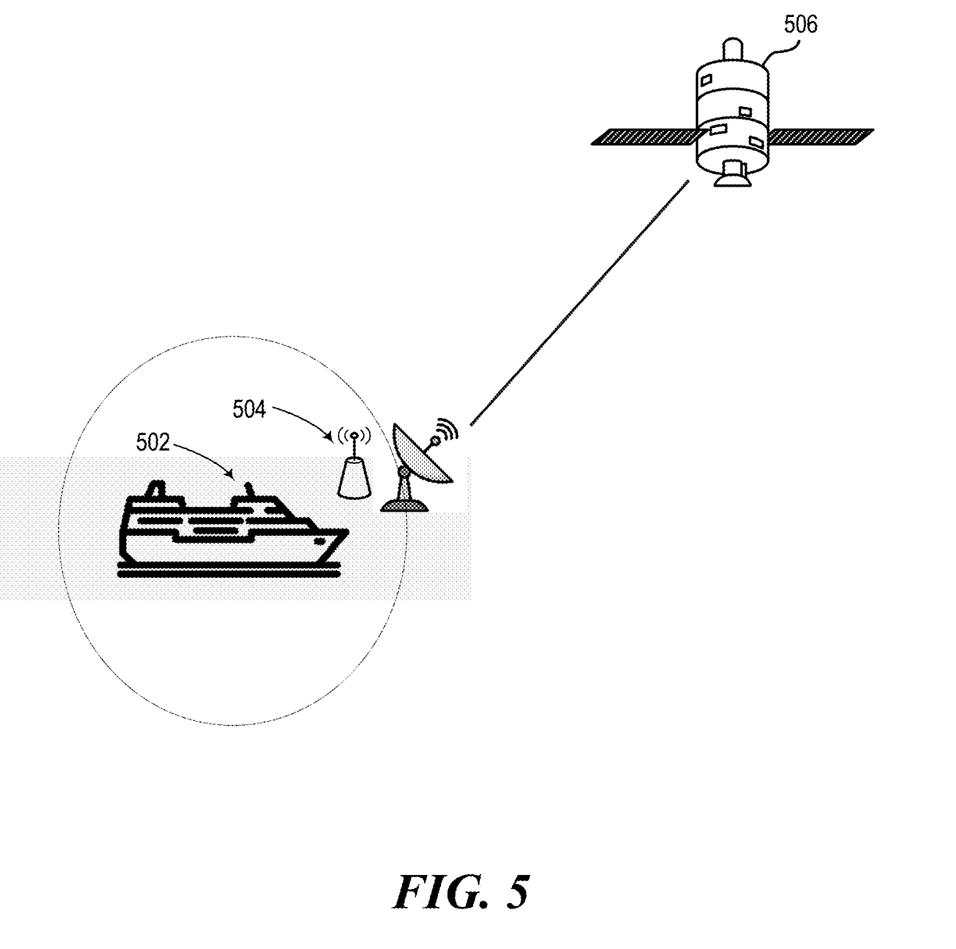
FIG. 5 is a diagram illustrating another deployment scenario of a non-terrestrial network (NTN), in accordance with aspects of the present disclosure.

FIG. 5 is a diagram illustrating another deployment scenario of a non-terrestrial network (NTN), in accordance with aspects of the present disclosure. FIG. 5 shows a deployment of a legacy satellite-based deployment scenario for ships (e.g., a ship 502) and airplanes (not shown), via a satellite 506. In this case, the satellite link is used only as backhaul.

Furthermore, 3GPP access may be provided by an onboard radio access network (RAN) 504. This deployment would be applicable to international waters and/or airspace (e.g., if the ship 502 is instead an aircraft). Furthermore, this deployment may experience little or no issues with cross-border leakage or with PLMN ID usage.

Given the various issues presented in the deployments described above, it may be advantageous for a UE to implement a modified version of a PLMN selection procedure in order to access a network, such as an NTN, from within an international area or when a UE is served by a PLMN with a shared PLMN ID. As will be described, the UE may generate a list of available PLMNs that are allowed to be selected from within an international area or when a UE is served by a PLMN with a shared PLMN ID, and perform PLMN selection based on the new list. Other solutions will also be described, such as triggering PLMN selection when located within an international area.

The techniques described may be deployed, for example, by a UE to perform PLMN selection for NTN (e.g., satellite) access. In some cases, NTN access may be considered as a separate radio access technology (RAT) from terrestrial access. NTN access may use a separate frequency band as compared to terrestrial access.

Additionally, it may be assumed that a UE performing PLMN selection for non-terrestrial (satellite) access is configured with "User Controlled PLMN Selector with Access Technology" and/or "Operator Controlled PLMN Selector with Access Technology" files in the Universal SIM (USIM). Each of these files may contain a prioritized (e.g., ordered) list of PLMNs with corresponding supported RATs.

In general, the PLMN selection procedure may be executed at the NAS protocol layer. As described above, each PLMN may broadcast, in the system information, its own identity (e.g., PLMN ID), which includes a MCC uniquely defining the country of the PLMN. Thus, lower layers (e.g., the access stratum (AS)) may scan the available networks and provide the list of available PLMNs along with the RAT to the NAS layer. The PLMN IDs with a shared MCC (e.g., 9xx) are not associated with any country. These PLMN IDs are used for international areas, but not exclusively.

During a legacy periodic PLMN search for a high priority PLMN (HP-PLMN), the UE eliminates candidate PLMNs that have a different MCC from the serving PLMN. The rationale is to limit the search to the same country. This should not occur if the UE knows that it is located inside international areas. According to aspects of the present disclosure, during the PLMN search for the HP-PLMN, the UE does not limit the search to the same MCC as the serving PLMN.

During a legacy periodic PLMN search for a high priority PLMN (HP-PLMN), the UE considers the equivalent PLMN list provided by the serving PLMN. This should not occur if the serving PLMN was not selected when the UE was located inside international areas. For example, the UE could belong to a Canadian customer who leaves port from the United States. In this case, the equivalent PLMN list supplied by the last serving PLMN in the United States may not be valid when on international waters for a Canadian customer. According to aspects of the present disclosure, upon entering an international area, the UE deletes the equivalent PLMN list provided by the last serving PLMN, prior to PLMN selection.

Currently, the UE always considers the last registered PLMN (RPLMN) as the highest priority for PLMN selection. This should not be the case by default inside international areas. For example, the UE could belong to a Canadian customer who leaves port from the United States. In this case, the customer may prefer a Canadian PLMN when on international waters, instead of the United States PLMN serving the port. According to aspects of the present disclosure, the UE does not consider the RPLMN as the highest priority PLMN when within an international area. Rather, the UE considers the HPLMN list or EHPLMN list (retrieved from the USIM) as highest priority.

In further aspects of the present disclosure, the UE triggers PLMN selection when the UE finds itself inside international areas. The UE also triggers PLMN selection when the UE leaves international areas. The new triggers may be for PLMN selection upon recovery from lack of coverage. These new triggers may be in addition to legacy triggers.

Currently, there is no way to define different PLMN prioritization for PLMN selection when the UE is in an international area as opposed to being inside a country. According to aspects of the present disclosure, the UE has a separate PLMN selector list in the USIM designated for international areas. The separate international list may have different priorities than the legacy PLMN selector lists. Alternatively, a new indication that the PLMN can be selected in international areas can be added to the legacy PLMN selector lists. According to aspects of the present disclosure, for a radio cell that is deployed to cover a geographical area located in an international area, the broadcast channel of the radio cell of the PLMN may include the indication that the PLMN of the radio cell is intended for international access. In other aspects, the indication may be retrieved from a USIM. Upon receiving the indication, the UE may consider the PLMN of the radio cell as intended for international access. These aspects may apply to the scenario shown by FIG. 5, for example. In some aspects, the new indication may be implemented as a binary flag. In other aspects, the new indication may be implemented as an MCC associated with international areas.

Figure 6:
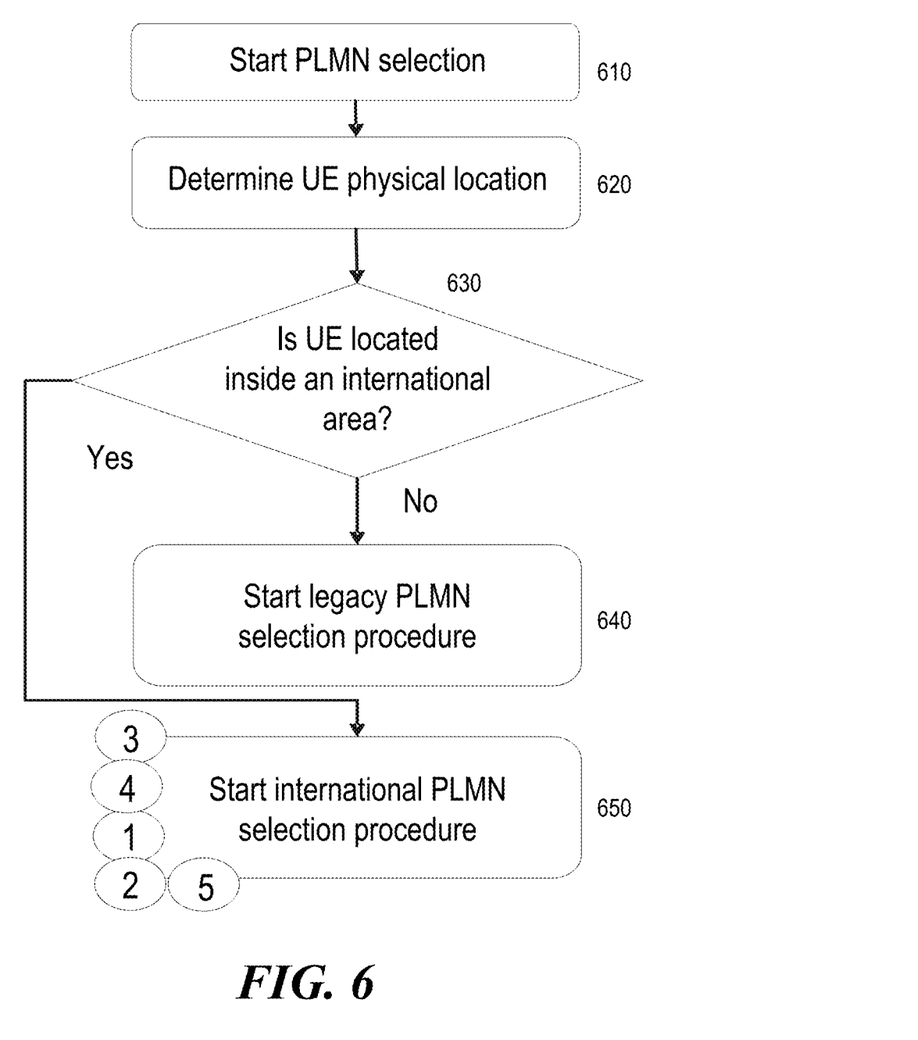
FIG. 6 is a flow diagram illustrating public land mobile network (PLMN) selection when a UE is located in an international area, in accordance with aspects of the present disclosure.

FIG. 6 is a flow diagram illustrating public land mobile network (PLMN) selection when a UE is located in an international area, in accordance with aspects of the present disclosure. At block 610, PLMN selection starts. For example, selection may start based on loss of coverage (e.g., during power up) or while roaming. At block 620, the UE determines its physical location. Based on the location, the UE determines whether it is located in an international area, at block 630. If not, legacy PLMN selection occurs at block 640. If the UE is located inside an international area, at block 650 the logic follows a separate branch in the PLMN selection procedure, where the UE starts an international PLMN selection procedure.

For example, if the UE is out of coverage, the UE may apply a first option including triggering PLMN selection upon leaving or entering the international area. In a second option, the UE may also consider the HPLMN list or EHPLMN list as highest priority, instead of a recently registered PLMN. This may occur in addition to the first option, or instead of the first option. In addition, or alternatively, the UE may implement a third option, using a separate international PLMN selector list or relying on indications of whether a PLMN is for international access. In addition, or alternatively, in a fourth option the UE may delete the equivalent PLMN list. If a periodic search for a higher priority PLMN occurs, the UE may apply a fifth option where the UE does not limit the search based on the MCC.

When the UE is served by a PLMN with a shared PLMN ID (e.g., with MCC 9xx), the UE may be inside an international area or outside an international area. In either case, it would be beneficial to have an improved PLMN selection procedure.

Issues with the legacy PLMN selection procedure in this scenario include: during periodic PLMN search for the HP-PLMN, the UE eliminates the candidate PLMNs that have a different MCC from the serving PLMN. The rationale is to limit the search to the same country. This should not occur if the serving PLMN has a shared PLMN ID (e.g., where the MCC is 9xx) or the candidate PLMN has a shared PLMN ID. According to aspects of the present disclosure, if the UE is served by a PLMN with a shared PLMN ID, during a PLMN search for a HP-PLMN, the UE does not eliminate the candidate PLMNs that have a different MCC from the serving PLMN. This applies to both PLMN selection inside international areas and within a country. In addition, or alternatively, the UE may use a separate international PLMN selector list or rely on indications of whether a PLMN is intended for international access.

Figure 7:
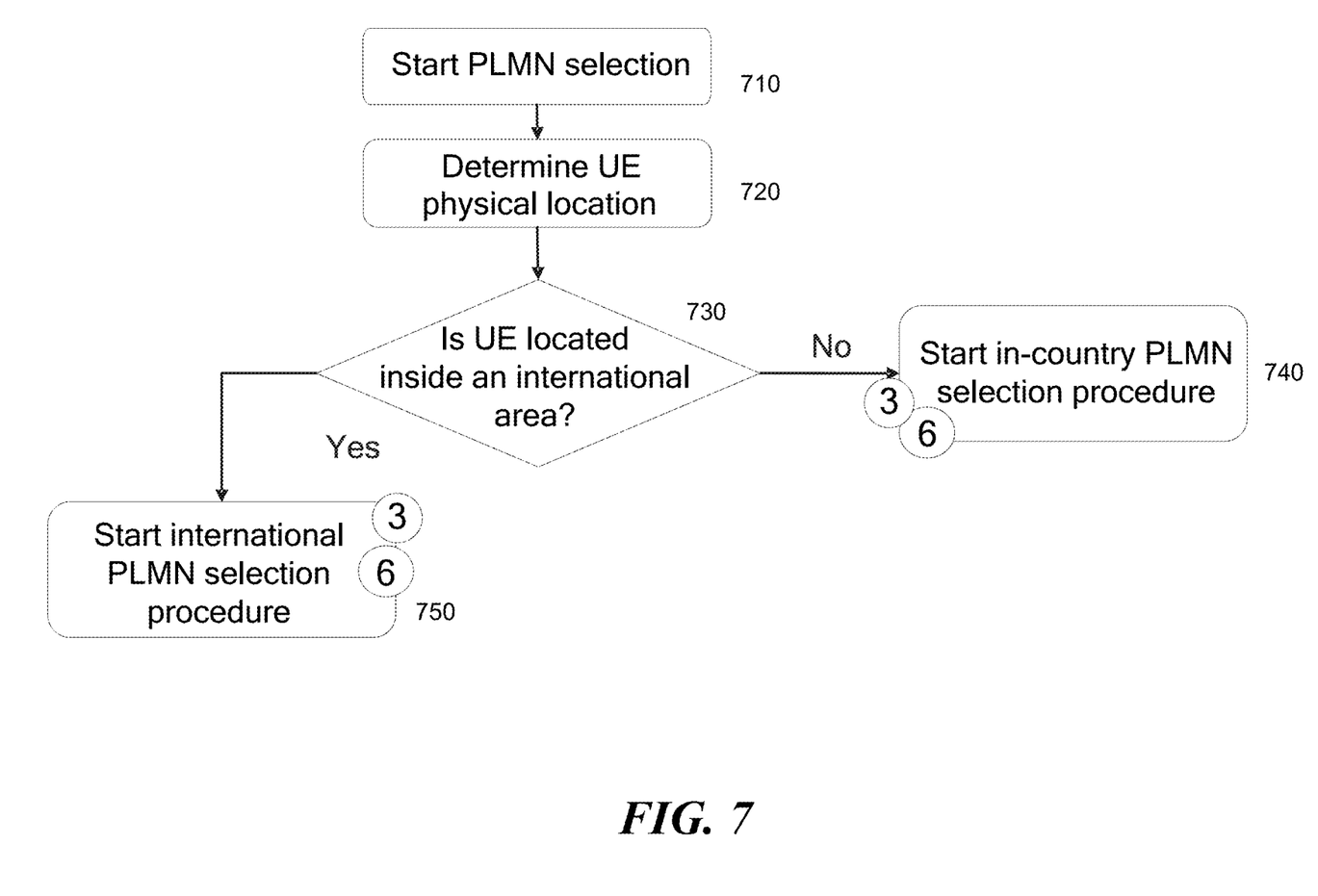
FIG. 7 is a flow diagram illustrating public land mobile network (PLMN) selection when a UE is served by a PLMN with a shared PLMN ID, in accordance with aspects of the present disclosure.

FIG. 7 is a flow diagram illustrating public land mobile network (PLMN) selection when a UE is served by a PLMN with a shared PLMN ID, in accordance with aspects of the present disclosure. At block 710, PLMN selection starts. For example, selection may start based on UE roaming. At block 720, the UE determines its physical location. Based on the location, the UE determines whether it is located in an international area at block 730. If not, at block 740, a PLMN selection procedure for when inside a country occurs. If the UE is located inside an international area, at block 750 the UE starts an international PLMN selection procedure.

At both blocks 740 and 750, the UE may apply a sixth option. During a legacy periodic PLMN search for a high priority PLMN (HP-PLMN), the UE eliminates candidate PLMNs that have a different MCC from the serving PLMN. According to aspects of the present disclosure, during the PLMN search for the HP-PLMN, the UE does not limit the search to the same MCC as the serving PLMN. This option applies regardless of whether the UE is in an international area. Rather, the option applies when the UE is served with a shared PLMN ID. In addition, or alternatively, the UE may implement the third option, using a separate international PLMN selector list or relying on indications of whether a PLMN is intended for international access.

As indicated above, FIGS. 3-7 are provided as examples. Other examples may differ from what is described with respect to FIGS. 3-7.

Figure 8:
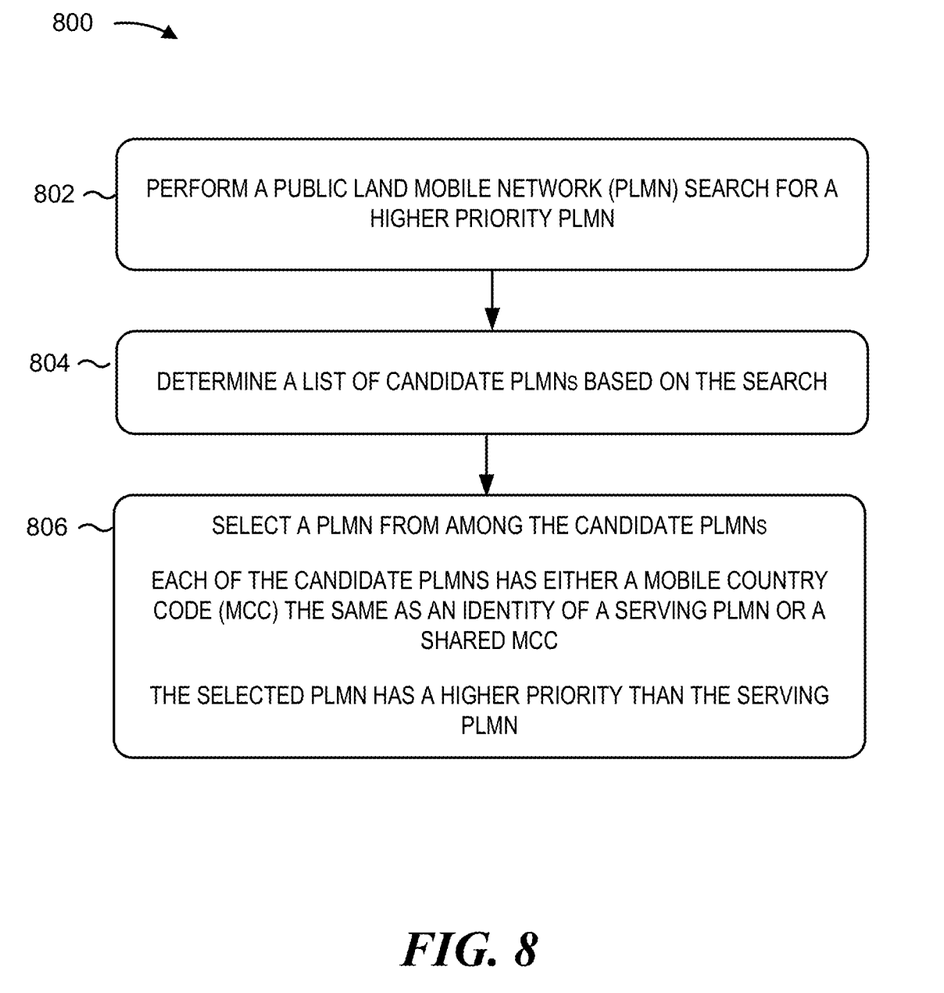
FIG. 8 is a flow diagram illustrating an example process performed, for example, by a user equipment (UE), in accordance with various aspects of the present disclosure.

FIG. 8 is a flow diagram illustrating an example process 800 performed, for example, by a UE, in accordance with various aspects of the present disclosure. The example process 800 is an example of wireless network selection for satellite access in international areas.

As shown in FIG. 8, in some aspects, the process 800 may include performing a public land mobile network (PLMN) search for a higher priority PLMN (block 802). For example, the UE (e.g., using the antenna 252, DEMOD/MOD 254, MIMO detector 256, TX MIMO processor 266, receive processor 258, transmit processor 264, controller/processor 280, and/or memory 282) can perform a PLMN search. In some aspects, performing the PLMN search occurs in response to determining the UE is located within an international area. The PLMN may provide non-terrestrial network access.

In some aspects, the process 800 may also include determining a list of candidates PLMNs based on the search (block 804). For example, the UE (e.g., using controller/processor 280, and/or memory 282) can determine the list of candidates PLMNs based on the search. In some aspects, the identity of the serving PLMN includes a shared mobile country code (MCC). In other aspects, the at least one identity of the candidate PLMN includes a MCC. The shared MCC may be in a range of 900 to 999.

In some aspects, the process 800 may also include selecting a PLMN from among the candidate PLMNs (block 806). Each of the candidate PLMNs has either a mobile country code (MCC) the same as an identity of a serving PLMN or a shared MCC. The selected PLMN has a higher priority than the serving PLMN. For example, the UE (e.g., using the antenna 252, DEMOD/MOD 254, MIMO detector 256, TX MIMO processor 266, receive processor 258, transmit processor 264, controller/processor 280, and/or memory 282) can select the PLMN. In some aspects, the selecting of the PLMN is from a list dedicated to international area searching. In other aspects, the selecting of the PLMN is based on an indication that the PLMN is eligible for selection in an international area.

Figure 9:
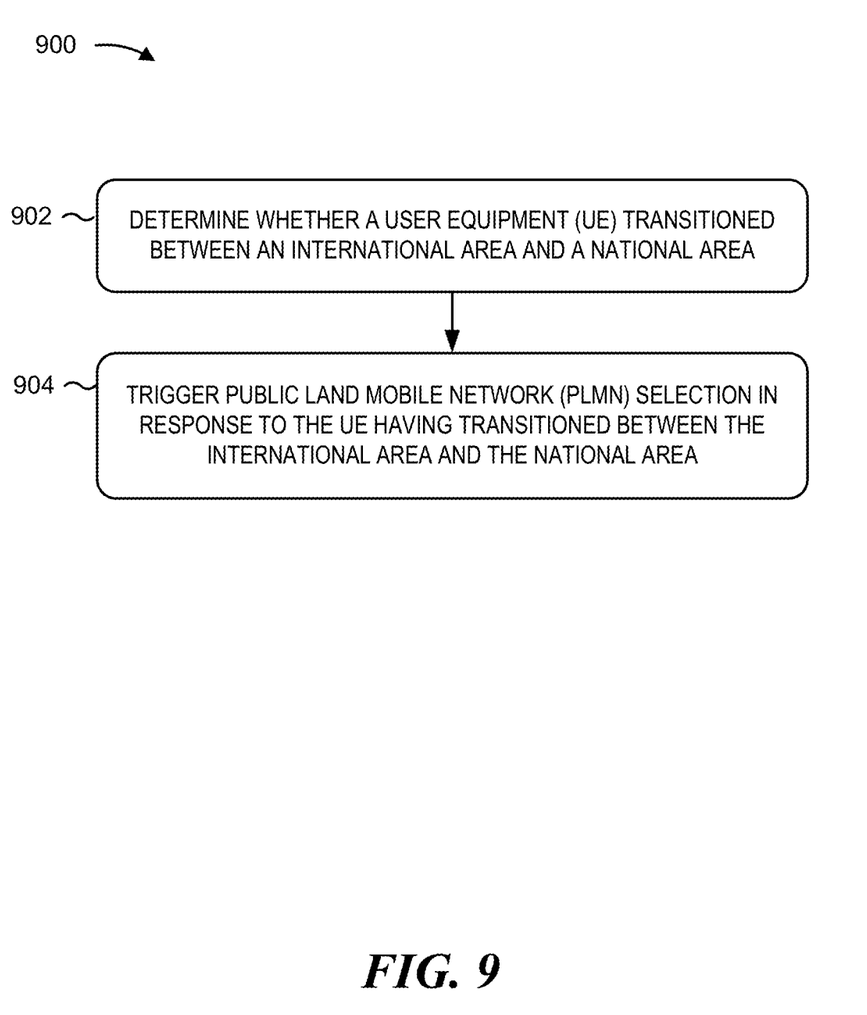
FIG. 9 is a flow diagram illustrating another example process performed, for example, by a user equipment (UE), in accordance with various aspects of the present disclosure.

FIG. 9 is a flow diagram illustrating an example process 900 performed, for example, by a UE, in accordance with various aspects of the present disclosure. The example process 900 is an example of wireless network selection for satellite access in international areas.

As shown in FIG. 9, in some aspects, the process 900 may include determining whether the UE transitioned between an international area and a national area (block 902). For example, the UE (e.g., using the antenna 252, DEMOD/MOD 254, MIMO detector 256, TX MIMO processor 266, receive processor 258, transmit processor 264, controller/processor 280, and/or memory 282) can determine whether the UE transitioned between an international area and a national area. The UE may determine the UE is located in the international area, and then select a PLMN from a list dedicated to international area searching. The UE may determine the UE is located in the international area, and then select a PLMN based on an indication that the PLMN is eligible for selection in the international area. In some aspects, the PLMN selection is for non-terrestrial network (NTN) access.

In some aspects, the process 900 may also include triggering public land mobile network (PLMN) selection in response to the UE having transitioned between the international area and the national area (block 904). For example, the UE (e.g., using the antenna 252, DEMOD/MOD 254, MIMO detector 256, TX MIMO processor 266, receive processor 258, transmit processor 264, controller/processor 280, and/or memory 282) can trigger PLMN selection. In some aspects, a high priority PLMN list is prioritized over a most recently registered PLMN during PLMN selection. The high priority PLMN list may comprise a home public land mobile network (HPLMN) list. The high priority PLMN list may comprise an equivalent home public land mobile network (EHPLMN) list. In some aspects, the UE may delete an equivalent public land mobile network list, which was received from a last serving PLMN, prior to PLMN selection.

Figure 10:
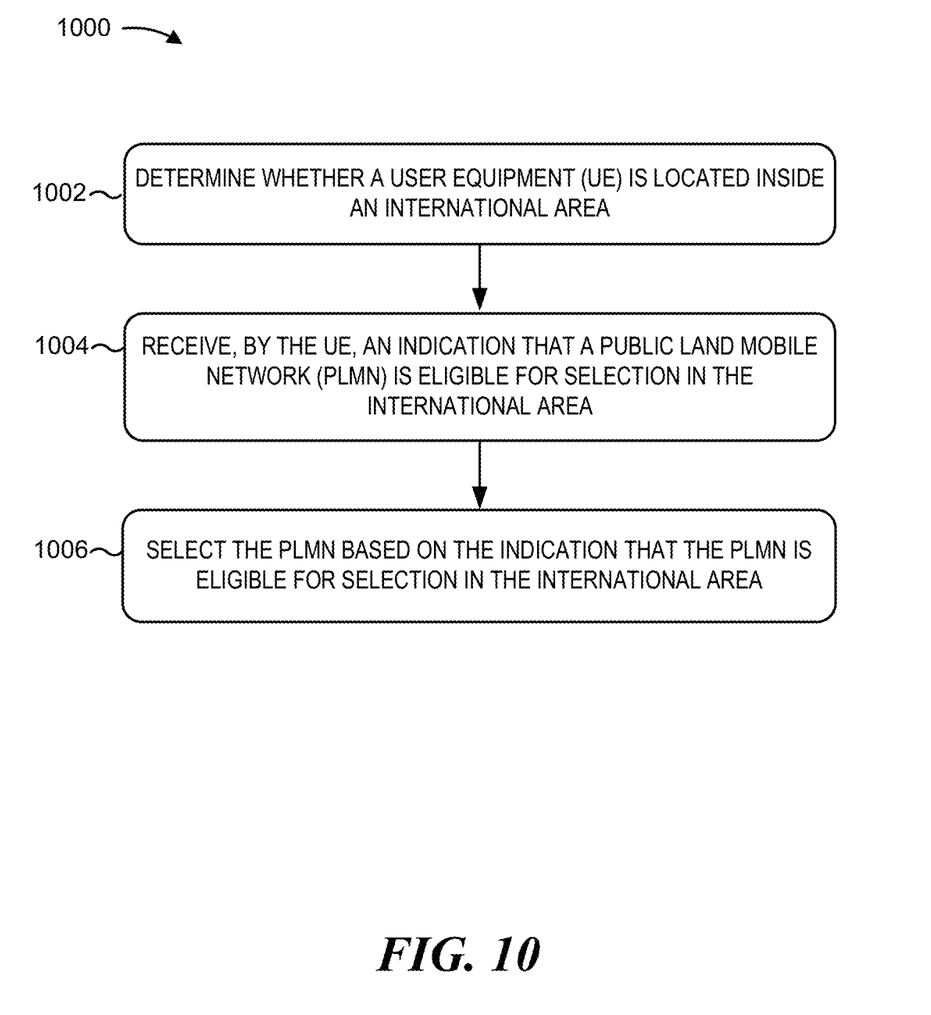
FIG. 10 is a flow diagram illustrating another example process performed, for example, by a user equipment (UE), in accordance with various aspects of the present disclosure.

FIG. 10 is a flow diagram illustrating an example process 1000 performed, for example, by a UE, in accordance with various aspects of the present disclosure. The example process 1000 is an example of wireless network selection for satellite access in international areas. As shown in FIG. 10, in some aspects, the process 1000 may include determining whether the UE is located inside an international area (block 1002). For example, the UE (e.g., using the antenna 252, DEMOD/MOD 254, MIMO detector 256, TX MIMO processor 266, receive processor 258, transmit processor 264, controller/processor 280, and/or memory 282) can determine where the UE is located. In some aspects, the process 1000 may also include receiving, by the UE, an indication that a public land mobile network (PLMN) is eligible for selection in the international area (block 1004). For example, the UE (e.g., using the antenna 252, DEMOD/MOD 254, MIMO detector 256, TX MIMO processor 266, receive processor 258, transmit processor 264, controller/processor 280, and/or memory 282) can receive the indication. In some aspects, the process 1000 may also include selecting the PLMN based in the indication that the PLMN is eligible for selection in the international area (block 1006). For example, the UE (e.g., using the antenna 252, DEMOD/MOD 254, MIMO detector 256, TX MIMO processor 266, receive processor 258, transmit processor 264, controller/processor 280, and/or memory 282) can select the PLMN.

Example Aspects

Aspect 1: A method of wireless communication by a user equipment (UE), comprising: determining whether the UE transitioned between an international area and a national area; and triggering public land mobile network (PLMN) selection in response to the UE having transitioned between the international area and the national area.

Aspect 2: The method of Aspect 1, further comprising prioritizing a high priority PLMN list over a most recently registered PLMN (RPLMN) during PLMN selection.

Aspect 3: The method of Aspect 1 or 2, in which the high priority PLMN list comprises a home public land mobile network (HPLMN) list.

Aspect 4: The method of any Aspects 1 or 2, in which the high priority PLMN list comprises an equivalent home public land mobile network (EHPLMN) list.

Aspect 5: The method of any of the preceding Aspects, further comprising deleting an equivalent public land mobile network list, which was received from a last serving PLMN, prior to PLMN selection.

Aspect 6: The method of any of the preceding Aspects, further comprising: determining the UE is located in the international area; and selecting a PLMN from a list dedicated to international area searching.

Aspect 7: The method of any of the preceding Aspects 1-5, further comprising: determining the UE is located in the international area; and selecting a PLMN based on an indication that the PLMN is eligible for selection in the international area.

Aspect 8: The method of any of the preceding Aspects, further comprising retrieving the indication from a universal subscriber identity module (USIM).

Aspect 9: The method of any of the preceding Aspects 1-7, further comprising receiving the indication on a broadcast channel of a radio cell of the PLMN.

Aspect 10: The method of any of the preceding Aspects, in which the PLMN selection is for non-terrestrial network (NTN) access.

Aspect 11: The method of any of the preceding Aspects, further comprising performing the PLMN selection without considered a last registered PLMN (RPLMN) as a highest priority PLMN.

Aspect 12: A method of wireless communication by a user equipment (UE), comprising: performing a public land mobile network (PLMN) search for a higher priority PLMN; determining a list of candidates PLMNs based on the search; and selecting a PLMN from among the list of candidate PLMNs, each of the candidate PLMNs having either a mobile country code (MCC) the same as an identity of a serving PLMN or a shared MCC, the selected PLMN having a higher priority than the serving PLMN.

Aspect 13: The method of Aspect 12, in which the list of candidate PLMNs includes candidate PLMNs with either the shared MCC or a different MCC than the serving PLMN, when the identity of the serving PLMN comprises the shared MCC.

Aspect 14: The method of Aspect 12 or 13, further comprising initiating a registration procedure with the selected PLMN.

Aspect 15: The method of any of the Aspects 12-14, in which performing the PLMN search occurs in response to determining the UE is located within an international area.

Aspect 16: The method of any of the Aspects 12-15, in which the identity of the serving PLMN includes the shared MCC.

Aspect 17: The method of any of the Aspects 12-16, in which an identity of at least one of the candidate PLMNs includes the shared MCC.

Aspect 18: The method of any of the Aspects 12-17, in which the shared MCC is in a range of 900 to 999.

Aspect 19: The method of any of the Aspects 12-18, in which at least one of the candidate PLMNs provides non-terrestrial network access.

Aspect 20: The method of any of the Aspects 12-19, in which the list is dedicated to international area searching.

Aspect 21: The method of any of the Aspects 12-20, further comprising selecting the PLMN based on an indication that the PLMN is eligible for selection in an international area.

Aspect 22: An apparatus for wireless communications performed by a wireless device, comprising: a processor, memory coupled with the processor; and instructions stored in the memory and operable, when executed by the processor, to cause the apparatus: to determine whether the UE transitioned between an international area and a national area; and to trigger public land mobile network (PLMN) selection in response to the UE having transitioned between the international area and the national area.

Aspect 23: The apparatus of Aspect 22, in which the processor causes the apparatus to prioritize a high priority PLMN list over a most recently registered PLMN during PLMN selection.

Aspect 24: The apparatus of Aspect 22 or 23, in which the PLMN selection is for non-terrestrial network (NTN) access.

Aspect 25: The apparatus of any of the Aspects 22-24, in which the processor causes the apparatus to perform the PLMN selection without considered a last registered PLMN (RPLMN) as a highest priority PLMN.

Aspect 26: An apparatus for wireless communications performed by a wireless device, comprising: a processor, memory coupled with the processor; and instructions stored in the memory and operable, when executed by the processor, to cause the apparatus: to perform a public land mobile network (PLMN) search for a higher priority PLMN; to determine a list of candidates PLMNs based on the search; and; to select a PLMN from among the list of candidate PLMNs, each of the candidate PLMNs having either a mobile country code (MCC) the same as an identity of a serving PLMN or a shared MCC, the selected PLMN having a higher priority than the serving PLMN.

Aspect 27: The apparatus of Aspect 26, in which the list of candidate PLMNs includes candidate PLMNs with either the shared MCC or a different MCC than the serving PLMN, when the identity of the serving PLMN comprises the shared MCC.

Aspect 28: The apparatus of Aspect 26 or 27, in which the shared MCC is in a range of 900 to 999.

Aspect 29: The apparatus of any of the Aspects 26-28, in which at least one of the candidate PLMNs provides non-terrestrial network access.

Aspect 30: The apparatus of any of the Aspects 26-29, in which the processor causes the apparatus to select the PLMN based on an indication that the PLMN is eligible for selection in an international area.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising: performing a public land mobile network (PLMN) scan for a higher priority PLMN; reporting a list of candidates PLMNs based on the scan, wherein an identity of one of the candidate PLMNs includes a shared mobile country code (MCC), the shared MCC having a value between 900 and 999 and is also used for performing access with satellite technology; and selecting a PLMN from among the list of candidate PLMNs, each of the candidate PLMNs having either a mobile country code (MCC) the same as an identity of a serving PLMN or the shared MCC, the selected PLMN having a higher priority than the serving PLMN.

2. The method of claim 1, in which the list of candidate PLMNs includes candidate PLMNs with either the shared MCC or a different MCC than the serving PLMN, when the identity of the serving PLMN comprises the shared MCC.

3. The method of claim 1, further comprising initiating a registration procedure with the selected PLMN.

4. The method of claim 1, in which performing the PLMN search occurs in response to determining the UE is located within an international area.

5. The method of claim 1, in which the identity of the serving PLMN includes the shared MCC.

6. The method of claim 1, in which one of the candidate PLMNs provides non-terrestrial network access.

7. The method of claim 1, in which the list is dedicated to international area searching.

8. The method of claim 1, further comprising selecting the PLMN based on an indication that the PLMN is eligible for selection in an international area.

9. An apparatus for wireless communications performed by a wireless device, comprising: at least one processor, memory coupled with the at least one processor; and instructions stored in the memory and operable, when executed by the at least one processor, to cause the apparatus: to perform a public land mobile network (PLMN) scan for a higher priority PLMN; to report a list of candidates PLMNs based on the scan, wherein an identity of one of the candidate PLMNs includes a shared mobile country code (MCC), the shared MCC having a value between 900 and 999 and is also used for performing access with satellite technology; and to select a PLMN from among the list of candidate PLMNs, each of the candidate PLMNs having either a mobile country code (MCC) the same as an identity of a serving PLMN or the shared MCC, the selected PLMN having a higher priority than the serving PLMN.

10. The apparatus of claim 9, in which the list of candidate PLMNs includes candidate PLMNs with either the shared MCC or a different MCC than the serving PLMN, when the identity of the serving PLMN comprises the shared MCC.

11. The apparatus of claim 9, in which one of the candidate PLMNs provides non-terrestrial network access.

12. The apparatus of claim 9, in which the processor causes the apparatus to select the PLMN based on an indication that the PLMN is eligible for selection in an international area.

* * * * *